US010911134B1

(12) United States Patent
Choquette et al.

(10) Patent No.: US 10,911,134 B1
(45) Date of Patent: Feb. 2, 2021

(54) SYSTEM AND METHOD FOR EFFICIENT AND SCALABLE VSAT REAL-TIME MONITORING (VRTM)

(71) Applicant: HUGHES NETWORK SYSTEMS, LLC, Germantown, MD (US)

(72) Inventors: George Choquette, Germantown, MD (US); Tayyab Khan, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 0 days.

(21) Appl. No.: 16/732,233

(22) Filed: Dec. 31, 2019

(51) Int. Cl.
| | | |
|---|---|---|
| *H04W 28/06* | (2009.01) | |
| *H04B 7/185* | (2006.01) | |
| *H04W 88/16* | (2009.01) | |
| *H04W 84/06* | (2009.01) | |

(52) U.S. Cl.
CPC ..... *H04B 7/18519* (2013.01); *H04B 7/18513* (2013.01); *H04B 7/18582* (2013.01); *H04B 7/18584* (2013.01); *H04W 28/06* (2013.01); *H04W 84/06* (2013.01); *H04W 88/16* (2013.01)

(58) Field of Classification Search
CPC ............ H04B 7/18519; H04B 7/18513; H04B 7/18582; H04B 7/18584; H04W 28/06; H04W 84/06; H04W 88/16
USPC .......................... 455/12.1; 342/352; 370/316
See application file for complete search history.

(56) References Cited

U.S. PATENT DOCUMENTS

| | | | | | |
|---|---|---|---|---|---|
| 4,047,151 | A | * | 9/1977 | Rydbeck | H03M 13/35 714/774 |
| 4,261,054 | A | * | 4/1981 | Scharla-Nielsen | H04B 7/18543 342/353 |
| 4,309,764 | A | * | 1/1982 | Acampora | H04L 1/0054 370/318 |
| 5,603,096 | A | * | 2/1997 | Gilhousen | H04W 52/267 455/69 |
| 5,665,249 | A | * | 9/1997 | Burke | B24B 37/04 216/2 |
| 5,699,365 | A | * | 12/1997 | Klayman | H03M 13/35 714/708 |
| 5,721,742 | A | * | 2/1998 | Okajima | H04L 1/0086 714/751 |
| 5,768,684 | A | * | 6/1998 | Grubb | H04B 7/18543 370/318 |
| 6,886,029 | B1 | * | 4/2005 | Pecus | H04L 12/1836 709/203 |
| 7,154,898 | B1 | * | 12/2006 | Pecus | H04N 21/23103 370/401 |
| 7,792,068 | B2 | * | 9/2010 | Robert, III | H04L 12/1836 370/316 |

(Continued)

*Primary Examiner* — Hai V Nguyen
(74) *Attorney, Agent, or Firm* — Jones Robb, PLLC

(57) ABSTRACT

A method and system for real-time monitoring of terminals in a satellite communication system is disclosed. The method includes creating a configuration profile specifying a reporting format for one or more object status, and transmitting the configuration profile to a terminal. The terminal subsequently generates a report containing the requested object status based on the configuration profile. The report is provided to a gateway responsible for managing the terminal using available space within existing traffic. The gateway subsequently forwards report to at least one destination entity.

40 Claims, 9 Drawing Sheets

(56) References Cited

U.S. PATENT DOCUMENTS

| | | | | |
|---|---|---|---|---|
| 8,032,073 B2* | 10/2011 | Youssefzadeh | ...... | H04B 7/2048 455/3.02 |
| 8,195,090 B2* | 6/2012 | Treesh | ................ | H04B 7/2041 455/13.2 |
| 8,260,900 B2* | 9/2012 | Morrison | .............. | H04L 41/044 709/223 |
| 8,345,650 B2* | 1/2013 | Foxworthy | ......... | H04L 12/4645 370/338 |
| 8,379,613 B2* | 2/2013 | Foxworthy | ......... | H04L 61/2007 370/338 |
| 8,682,825 B2* | 3/2014 | Negi | ...................... | G06Q 10/00 706/45 |
| 8,712,322 B2* | 4/2014 | Youssefzadeh | ...... | H04B 7/2048 455/13.2 |
| 8,792,821 B2* | 7/2014 | Treesh | ................ | H04B 7/2041 455/13.1 |
| 9,271,325 B2* | 2/2016 | Backholm | ............... | H04L 43/10 |
| 9,591,688 B2* | 3/2017 | Backholm | ............ | H04W 76/25 |
| 9,654,335 B2* | 5/2017 | Axelrod | ................ | H04L 41/042 |
| 9,756,677 B2* | 9/2017 | Backholm | ............. | H04L 69/16 |
| 9,820,330 B2* | 11/2017 | Nirantar | ........... | H04W 28/0231 |
| 10,063,311 B2* | 8/2018 | Gopal | ................. | B64G 1/1021 |
| 10,143,031 B2* | 11/2018 | Backholm | ............ | H04W 76/25 |
| 10,182,466 B2* | 1/2019 | Nirantar | ........... | H04W 52/0251 |
| 10,454,804 B2* | 10/2019 | Jain | ....................... | H04L 43/026 |
| 10,476,582 B1* | 11/2019 | Gomez | ............... | H04L 65/4069 |
| 2002/0091991 A1* | 7/2002 | Castro | ....................... | G06F 9/06 717/106 |
| 2006/0091999 A1* | 5/2006 | Howarth | ............... | G06K 17/00 340/10.3 |
| 2009/0042562 A1* | 2/2009 | Treesh | ................ | H04B 7/2041 455/428 |
| 2010/0217837 A1* | 8/2010 | Ansari | ................... | G05B 15/02 709/218 |
| 2010/0228854 A1* | 9/2010 | Morrison | ................ | H04L 29/00 709/224 |
| 2010/0265876 A1* | 10/2010 | Foxworthy | ......... | H04L 12/4645 370/316 |
| 2010/0265877 A1* | 10/2010 | Foxworthy | ........ | H04B 7/18513 370/316 |
| 2012/0246305 A1* | 9/2012 | Vedula | ................ | H04L 41/0233 709/224 |
| 2012/0289225 A1* | 11/2012 | Treesh | ............... | H04B 7/18513 455/428 |
| 2014/0244808 A1* | 8/2014 | Axelrod | ................ | H04L 41/042 709/220 |
| 2014/0321448 A1* | 10/2014 | Backholm | ............... | H04L 69/16 370/338 |
| 2014/0335881 A1* | 11/2014 | Rubin | ...................... | H04J 1/16 455/452.1 |
| 2014/0373124 A1* | 12/2014 | Rubin | ................... | H04W 72/10 726/7 |
| 2015/0318916 A1* | 11/2015 | Gopal | ................. | B64G 1/1085 455/13.1 |
| 2016/0174288 A1* | 6/2016 | Backholm | ............... | H04L 69/16 370/338 |
| 2016/0255139 A1* | 9/2016 | Rathod | ................. | H04L 51/046 709/203 |
| 2016/0381699 A1* | 12/2016 | Rubin | ...................... | H04L 1/00 370/329 |
| 2017/0171906 A1* | 6/2017 | Backholm | ............ | H04W 76/25 |
| 2017/0325280 A1* | 11/2017 | Backholm | ............ | H04L 43/10 |
| 2019/0098687 A1* | 3/2019 | Backholm | ............ | H04W 76/25 |
| 2019/0215694 A1* | 7/2019 | Rubin | .................... | H04L 67/34 |
| 2020/0052777 A1* | 2/2020 | Gomez | ................ | H04B 7/2041 |

\* cited by examiner

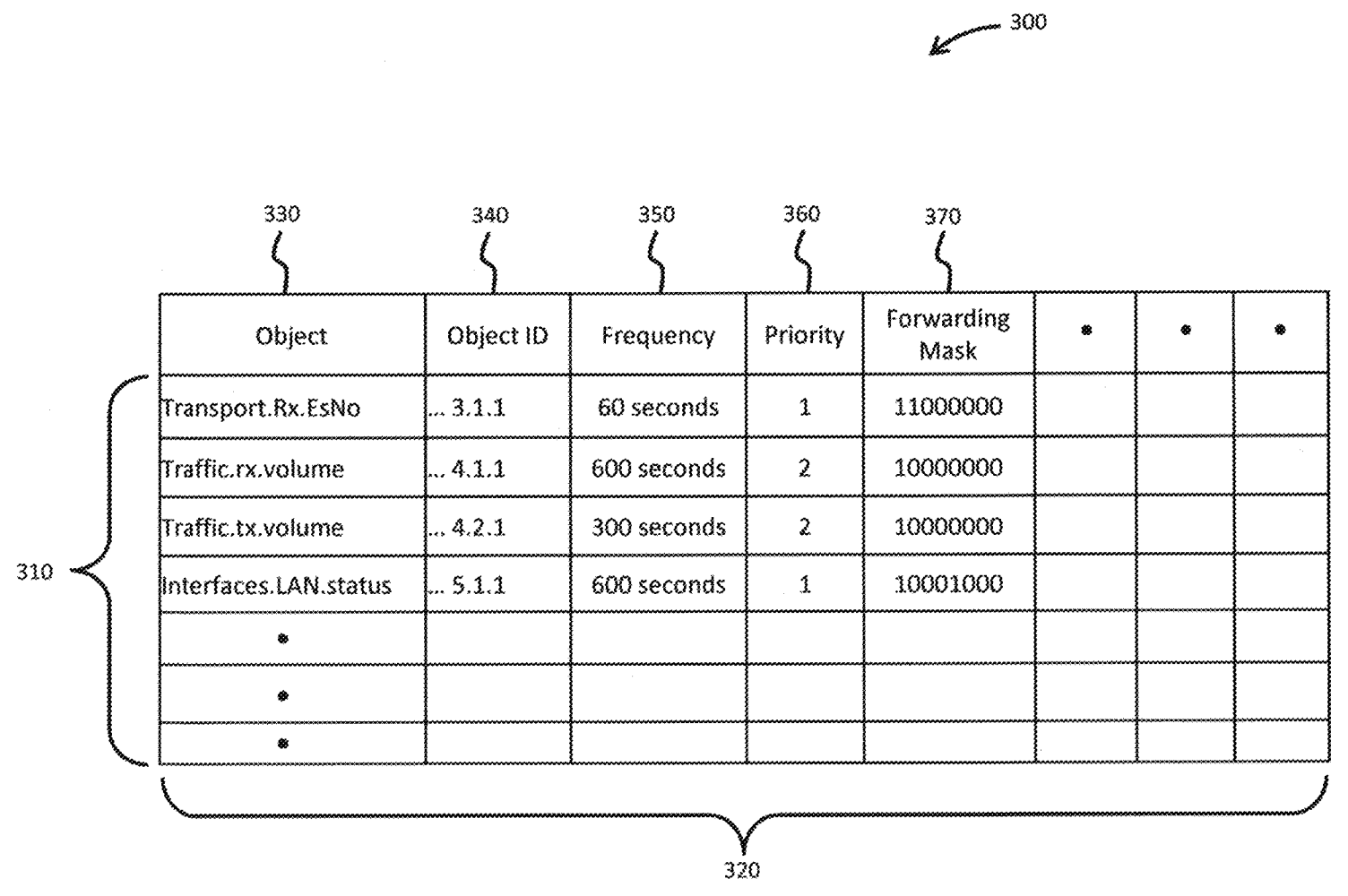

| Object | Object ID | Frequency | Priority | Forwarding Mask |
|---|---|---|---|---|
| Transport.Rx.EsNo | ...3.1.1 | 60 seconds | 1 | 11000000 |
| Traffic.rx.volume | ...4.1.1 | 600 seconds | 2 | 10000000 |
| Traffic.tx.volume | ...4.2.1 | 300 seconds | 2 | 10000000 |
| Interfaces.LAN.status | ...5.1.1 | 600 seconds | 1 | 10001000 |
| ⁎ | | | | |
| ⁎ | | | | |
| ⁎ | | | | |

Fig. 3

SYSTEM AND METHOD FOR EFFICIENT AND SCALABLE VSAT REAL-TIME MONITORING (VRTM)

BACKGROUND INFORMATION

Recent technological improvements have greatly increased the availability and use of satellite communication systems. Consumers utilize satellite communication systems for both voice and data communication. For example, consumers access video content, audio content, and gaming content in addition to conventional voice communication. In order to maintain efficient operations within the satellite network, however, it is often necessary to obtain information pertaining to the operational status of components such as satellite terminals (or simply terminals). For example, certain terminals can be programmed (or hard-coded) with an ability to collect predefined statistics at regular intervals (e.g., hourly), and submit reports containing the statistics every 24 hours during off-peak traffic periods. Such statistics facilitate reporting of a large volume of data types into different reporting and/or database tools.

While such information may be useful to periodically check the operational status of terminals, there is no flexibility to collect different information from the terminal because only the programmed statistics can be reported. Furthermore, it is necessary to obtain much more frequent reporting for specific statistical values to troubleshoot the satellite network, detect an anticipated problem, test system upgrades, meet customer requirements, etc. Additionally, certain statistics types would be very useful to have more frequently rather than as hourly averages or high water marks, for performance monitoring and assessment of the satellite network.

Various methods exist for collecting different statistics from terminals, without the need to hard-code the desired statistics. One such method is the use Simple Network Management Protocol (SNMP) polling for targeted statistics or status, which provides great flexibility in obtaining different statistics. Due to the large number of terminals in the network, it is not practical to send individual requests to each terminal using SNMP polling functions. Based on the foregoing, there is a need for an approach for dynamically selecting and monitoring statistics that can be used to determine the status of terminals in real-time.

BRIEF SUMMARY

A method is disclosed for real-time monitoring of terminals in a satellite communication system. According to an embodiment, the method includes: creating a configuration profile specifying a reporting format for one or more object status; transmitting the configuration profile to a terminal in a satellite communication system; generating a report containing the one or more object status based, at least in part, on the configuration profile, wherein the report is self-defining; transmitting the report to a gateway of the satellite communication system using available space within existing traffic of the terminal; extracting the report from the received traffic; and forwarding the report to at least one destination entity.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 3 is a diagram of a configuration table used to define reporting formats for monitoring information from terminals, according to one embodiment;

DETAILED DESCRIPTION

A method for efficient and scalable monitoring of terminals in real-time is described. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

Figure 1:
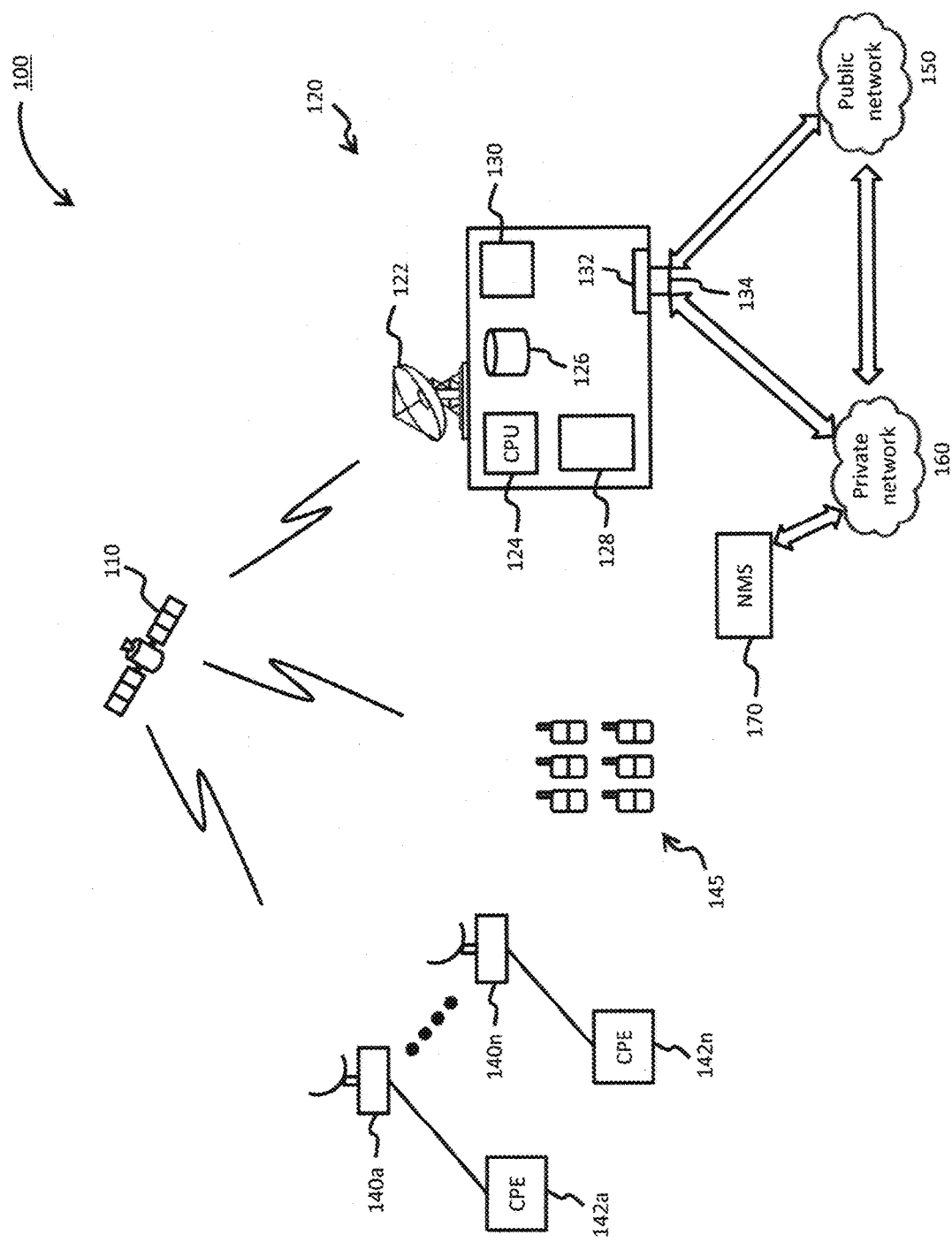
FIG. 1 is a diagram of a system capable of providing of voice and data services, according to at least one embodiment.

FIG. 1 illustrates a satellite communication system 100 capable of providing voice and data services. The satellite communication system 100 includes a satellite 110 that supports communications among a number of gateways 120 (only one shown) and multiple stationary satellite terminals 140a-140n. Each satellite terminal (or terminal) 140 can be configured for relaying traffic between its customer premise equipment (CPEs) 142a-142n (i.e., user equipment), a public network 150 such as the internet, and/or its private network 160. Depending on the specific embodiment, the customer premise equipment 142 can be a desktop computer, laptop, tablet, cell phone, etc. Customer premise equipment 142 can also be in the form of connected appliances that incorporate embedded circuitry for network communication can also be supported by the satellite terminal (or terminal) 140. Connected appliances can include, without limitation, televisions, home assistants, thermostats, refrigerators, ovens, etc. The network of such devices is commonly referred to as the internet of things (IoT).

According to an exemplary embodiment, the terminals 140 can be in the form of very small aperture terminals (VSATs) that are mounted on a structure, habitat, etc. Depending on the specific application, however, the terminal 140 can incorporate an antenna dish of different sizes (e.g., small, medium, large, etc.). The terminals 140 typically remain in the same location once mounted, unless otherwise removed from the mounting. According various embodiments, the terminals 140 can be mounted on mobile platforms that facilitate transportation thereof from one location to another. Such mobile platforms can include, for example, cars, buses, boats, planes, etc. The terminals 140 can further be in the form of transportable terminals capable of being transported from one location to another. Such transportable terminals are operational only after arriving at a particular destination, and not while being transported.

As illustrated in FIG. 1, the satellite communication system 100 can also include a plurality of mobile terminals 145 that are capable of being transported to different locations by a user. In contrast to transportable terminals, the mobile terminals 145 remain operational while users travel from one location to another. The terms user terminal, satellite terminal, terminal may be used interchangeably herein to identify any of the foregoing types. The gateway 120 can be configured to route traffic from stationary, transportable, and mobile terminals (collectively terminals 140) across the public network 150 and private network 160 as appropriate. The gateway 120 can be further configured to route traffic from the public internet 150 and private network 160 across the satellite link to the appropriate terminal 140. The terminal 140 then routes the traffic to the appropriate customer premise equipment (CPE) 142.

According to at least one embodiment, the gateway 120 can include various components, implemented in hardware, software, or a combination thereof, to facilitate communication between the terminals 140 and external networks 150, 160 via the satellite 110. According to an embodiment, the gateway 120 can include a radio frequency transceiver 122 (RFT), a processing unit 124 (or computer, CPU, etc.), and a data storage unit 126 (or storage unit). While generically illustrated, the CPU 124 can encompass various configurations including, without limitations, a personal computer, laptop, server, etc. As used herein, a transceiver corresponds to any type of antenna unit used to transmit and receive signals, a transmitter, a receiver, etc. The RFT 122 is useable to transmit and receive signals within a communication system such as the satellite communication system 100 illustrated in FIG. 1. The data storage unit 126 can be used, for example, to store and provide access to information pertaining to various operations in the satellite communication system 100. Depending on the specific implementation, the data storage unit 126 (or storage unit) can be configured as a single drive, multiple drives, an array of drives configured to operate as a single drive, etc.

According to other embodiments, the gateway 120 can include multiple processing units 124 and multiple data storage units 126 in order to accommodate the needs of a particular system implementation. Although not illustrated in FIG. 1, the gateway 120 can also include one or more workstations 125 (e.g., computers, laptops, etc.) in place of, or in addition to, the one or more processing units 124. Various embodiments further provide for redundant paths for components of the gateway 120. The redundant paths can be associated with backup components capable of being seamlessly or quickly switched in the event of a failure or critical fault of the primary component.

According to the illustrated embodiment, the gateway 120 includes baseband components 128 which operate to process signals being transmitted to, and received from, the satellite 110. For example, the baseband components 128 can incorporate one or more modulator/demodulator units, system timing equipment, switching devices, etc. The modulator/demodulator units can be used to generate carriers that are transmitted into each spot beam and to process signals received from the terminals 140. The system timing equipment can be used to distribute timing information for synchronizing transmissions from the terminals 140.

According to an embodiment, a fault management unit 130 can be included in the gateway 120 to monitor activities and output one or more alerts in the event of a malfunction in any of the gateway components. The fault management unit 130 can include, for example, one or more sensors and interfaces that connect to different components of the gateway 120. The fault management unit 130 can also be configured to output alerts based on instructions received from a remotely located network management system 170 (NMS). The NMS 170 maintains, in part, information (configuration, processing, management, etc.) for the gateway 120, and all terminals 140 and beams supported by the gateway 120. The gateway 120 can further include a network interface 132, such as one or more edge routers, for establishing connections with a terrestrial connection point 134 from a service provider. Depending on the specific implementation, however, multiple terrestrial connection points 134 may be utilized.

Figure 2:
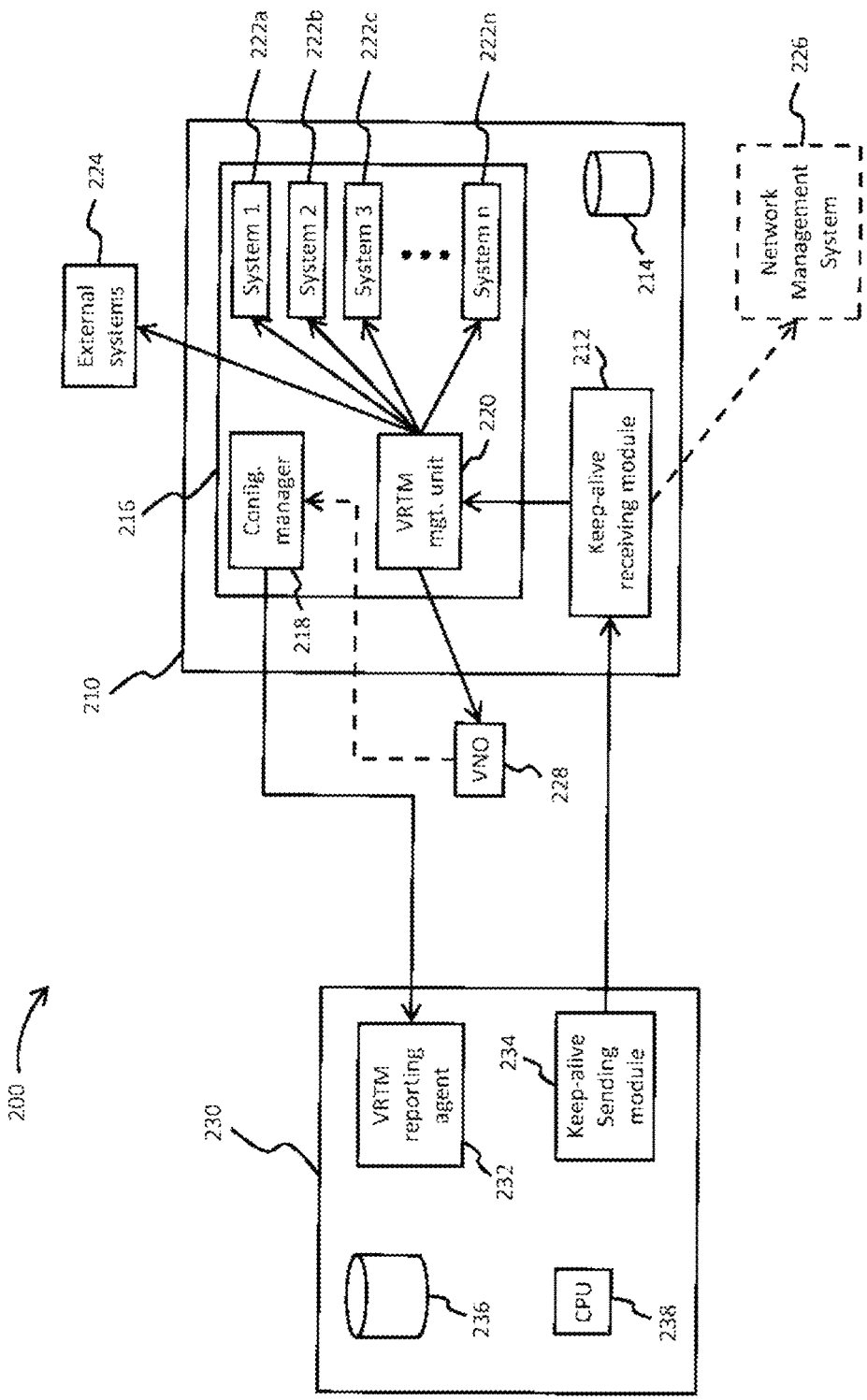
FIG. 2 is a diagram of a system for providing real-time monitoring of terminals such as those used in the system of FIG. 1, according to one embodiment.

FIG. 2 illustrates a system 200 for real-time monitoring of terminals, according to various embodiments. The system 200 includes a gateway 210, such as gateway 120 in FIG. 1, which communicates with a plurality of terminals 230 via a satellite such as the satellite 110. The terminals 230 can be one of the terminals 140 and 145 shown in FIG. 1, and have various configurations including, but not limited to, VSATs, fixed terminals with different antenna dish sizes, transportable terminals, mobile terminals, etc. Furthermore, certain types of terminals may be present in one beam and absent in another beam. Depending on the specific implementation, the system 200 may include multiple gateways 210 assigned to manage communication within different beams which define a geographical coverage area. A system 200 utilizing 100 beams to define the coverage area, for example, may utilize ten (10) gateways 210 assigned to manage ten (beams) each. The number of beams assigned to each gateway 210 can also vary depending on the number of terminals 230 located within each beam.

According to the illustrated embodiment, the gateway 210 can include, in part, a keep-alive receiving module 212 and a storage unit 214. It should be noted that other components (e.g., shown in FIG. 1), as well as others, may be included in the gateway 210. Such components have been omitted, however, in order to provide better clarity and conciseness in describing the novel features of the gateway 210. The keep-alive receiving module 212 is configured, in part, to receive periodic keep-alive messages from the terminals 230 for maintaining the status of open Transmission Control Protocol (TCP) and User Datagram Protocol (UDP) connections, without the need to utilize the bandwidth required to reestablish the connections. As can be appreciated, each terminal 230 may facilitate communication for various CPEs, and each CPE may have dozens of active TCP/UDP connections. The keep-alive receiving module 212 therefore receives messages from all active terminals 230 within its assigned beams. The storage unit 214 is configured to store information usable by the gateway 210 for maintaining normal system operations. Such information can include, for example, program code, data associated with each terminal 230, data associated with each assigned beam, etc.

According to at least one embodiment, an NMS (NMS) 216 can be co-located within the same physical structure as the gateway 210. NMS 216 and NMS 226 can be one of the NMS 170 shown in FIG. 1. According to other embodiments, however, a remotely located NMS 226 can establish a communication link with the gateway 210 (i.e., using the previously described hardware and external networks.). Regardless of the location, the NMS216 can include a configuration manager 218 and a VRTM management unit 220. The NMS 216 can also include multiple reporting systems, namely a first system 222a, a second system 222b, a third system 222c, . . . a final system 222n. As will be discussed in greater detail below, each system can be configured to receive different information (e.g., reports) from the terminals 230. External reporting systems 224 can also be configured to receive information (e.g., reports) from the terminals 230 by establishing a communication link with either NMS 216 or NMS 226. Additionally, the system 200 may include a virtual network operator (VNO) 228 capable of communicating with the gateway 210 and NMS 216, 226 in order to monitor the status of its own terminals 230. More particularly, a VNO 228 may be a business or government organization that purchases a managed service and associated capacity from a satellite network operator in order to provide communication connectivity and/or communication for a privately-owned set of terminals 230. The VNOs 228 can therefore manage various aspects of such terminals 230 via the gateway 210.

As illustrated in FIG. 2, the terminal 230 includes, in part, a VTRM reporting agent 232, a keep-alive sending module 234, a management information base (MIB) 236, and at least one CPU 238. The keep-alive sending module 234 is configured to send various control and traffic messages to the peer keep-alive receiving module 212 located at the gateway 210. According to an embodiment, the MIB 236 can be configured as a hierarchical tree structure of objects, associated with the terminal 230, that may be referenced using Abstract Syntax Notation One (ASN.1) syntax. For example, a message identifying a required MIB object can be sent using Simple Network Management Protocol (SNMP), or some other standardized protocol, to request the status of that object. The terminal 230 would subsequently send a response message with the requested object value.

Various status and statistical objects associated with the terminals 230 can be selected for real-time monitoring. The terms "object", "status object", "statistical object", "status and statistical object" are used interchangeably to identify objects stored in the MIB 236 of a terminal 230, and whose status can be requested using SNMP or other standardized protocols. The term "object status" is used to identify the current status of an object stored in the MIB 236. According to an embodiment, a configuration profile can be created to identify specific objects whose status may be required as part of monitoring the status of the terminal 230. The configuration profile can be created, for example, by the NMS 216 or subcomponents such as the configuration manager 218, and supplied to the terminal 230 as needed. The configuration profile can also be created by the VNO 228 in order to obtain the status of various objects for its terminals 230. As can be appreciated, a satellite network operator may be interested in the status of different objects than a VNO 228 which purchases managed service from the satellite network operator. The VNO 228 can therefore create custom configuration profiles that can be supplied to its terminals 230 by way of the gateway 210, NMS 216, 226 or both.

According to one or more embodiments, the configuration profile can be used for a single terminal or multiple terminals. More particularly, the same configuration profile can be supplied to multiple terminals 230 where an object status, such as received signal strength indication (RSSI) value, can be used to analyze signal quality across all beams managed by the gateway 210. The same configuration profile can also be supplied to all terminals 230 of a specific type, such as VSATs, stationary, transportable, mobile, etc. in order to analyze information specific to such terminal types. Alternatively, a custom configuration profile can be supplied to each terminal 230. Furthermore, the configuration profile can be dynamically created or modified and supplied to the terminal 230, and the specified object status would be returned by the terminal 230. For example, the object status reported by terminals 230 may indicate certain faults, problems, and/or inconsistencies with operations in the satellite network. The NMS 216 can utilize this information to modify the configuration profile so that the status of additional objects can be received and analyzed to confirm the existence of a suspected fault. The configuration profile allows the NMS 216 to obtain the status of specific objects in real-time without the need to poll such objects (which requires additional bandwidth) or hard-coding the object values to be sent within each terminal 230 (which cannot provide flexibility).

According to an embodiment, the NMS 216 (or appropriate entity) creates the configuration profile by selecting from among the total set of objects available for a particular terminal 230. The set of objects available for a VSAT, for example, may vary from those available for a mobile terminal. The NMS 216 can subsequently add, remove, or change the selected objects at any time while the terminal 230 is in operation. The status of these objects can therefore be monitored in real time. According to a specific implementation, the NMS 216 can be configured to display the MIB 236 structure of a selected terminal 230, or terminal type, hierarchically on a user interface (UI). An operator can interact with the UI to select the desired items for real time monitoring of the terminal 230 (or terminals) designated to receive that configuration profile.

Referring additionally to FIG. 3, an exemplary configuration profile 300 is shown, in accordance with at least one embodiment. The configuration profile 300 illustrates different fields that can be used to define the object status reports, according to various embodiments. The configuration profile 300 can include multiple rows (or entries) 310 which represent a different object status to be reported, and multiple columns 320 which define the desired parameters for the object report. Although the configuration profile 300 shown in FIG. 3 only contains 4 entries 310, it should be noted that the number of entries 310 in the configuration profile 300 as well as the particular column 320 parameters may vary depending on the specific system configuration, types of terminals, desired reporting information, etc. For example, many terminals 230 utilize an MIB 236 containing hundreds and potentially thousands of objects accessible by SNMP or other standard protocols. Each such object can be included as a column 320 parameter in the configuration profile 300, depending on the information or metrics desired. Accordingly, the entries shown in the configuration profile 300 should be considered as illustrative, and not restrictive.

According to one or more embodiments, the configuration profile 300 can include an object column 330, an object ID column 340, a frequency column 350, a priority column 360, and a forwarding mask column 370. As previously discussed, other fields (e.g., an object length) can be included in the configuration profile 300. The object column 330 in the configuration profile 300 contains a descriptive value which may be in the form of a name for the object. Depending on the specific system implementation, the object column 330 may be excluded from the configuration profile 300 prior to being supplied to the terminals 230. Alternatively, the terminals 230 can be configured to disregard values in the object column 330. The object ID column 340 contains an index that can be used by the terminal 230 to programmatically access the proper item from its object database (e.g., MIB). Accordingly, the index may be structured under the vendor product hierarchy specifications.

The frequency column 350 specifies the desired interval for generating the object status reports. The priority column 360 specifies a priority for the particular entry. According to an embodiment, this value is only used if the number of entries specified in the configuration profile 300 will not fit into the available bandwidth for VRTM reports. The forwarding mask 370 is a binary field (arbitrarily shown in this example as 8 bits) used by the VRTM management unit 220 of the NMS 216 to determine which systems should receive a given data report. According to the illustrated embodiment, the priorities in the configuration table 300 specify that the terminal's receive Es/No should be monitored frequently and terminal LAN interface status should be monitored less frequently as top priority objectives. Furthermore, traffic volume should be monitored as a lower priority objective. It should be noted that additional objects may be monitored in addition to SNMP type MIB objects. According to various embodiments, for example, the NMS 216 may designate specific objects for reporting. Such objects can be identified in configuration profiles downloaded to terminals, and terminals can map the identified object to methods for collecting current object values. Other identification methods may include uniform resource locator (URL) designations, object or retrieval interface indices, etc.

According to one or more embodiments, all entries in the configuration table 300 having a common reporting frequency may be included in a single object status report. Furthermore, if the reporting frequency of one entry is a multiple of another entry, both can be included in the object status report when the reporting frequencies overlap. For example, the first entry in the configuration table 300 has a reporting frequency of 60 second, while the third entry has a reporting frequency of 300 second. The fifth object status report for the first entry and the first object status report for the third entry would therefore overlap and be combined into a single object status report. Likewise, the tenth object status report for the first entry, the second object status report for the third entry, and the first object status reports for the second and fourth entries would all overlap and be combined into a single object status report. According to at least one embodiment, an object status report corresponding to multiple entries from the configuration table 300 can be separated into sub-reports if the size object status report is greater than the available space in the traffic data. Each sub-report can include, for example, one or more individual entries from the initial object status report (containing all four entries). The sub-reports can be defined based on various factors, such as available space in existing traffic opportunities, priority set in the configuration table, etc.

According to various embodiments, the listing of object types for reporting can be downloaded to terminals 230 in shared and dedicated configuration profiles. For example, one shared configuration profile 300 might be common to all terminals 230 in the system 200, and require that every terminal 230 report its receive Es/No value every minute. Another shared configuration profile 300 might be common to the subset of terminals 230 of a given virtual network operator (VNO) 228 or customer, for example, requiring each such terminal 230 to report its packet loss rate (PLR) or measured transit latency. A dedicated profile might be configured for a terminal 230 that is being monitored for some diagnostic purpose, for example, requiring the terminal 230 to report the status of user devices connected to its LAN interface.

The configuration profile received by the terminal 230 is processed by the VRTM reporting agent 232 to determine when snapshots of the object values being reported should be taken, and supplied to the NMS 216 by means of the gateway 210. According to various embodiments, the VRTM reporting agent 232 supplies the object values in a self-defining report format which allows a recipient device, such as the gateway 210 or VRTM management unit 220, to extract and forward reports containing the object values to the appropriate destination. The self-defining format can also be used by destination components, such as reporting systems 222, to determine what types of object values are being reported, without prior knowledge of how each terminal 230 will bundle object values into reporting messages.

According to at least one embodiment, a standard type-length-value (TLV) format can be used as the self-defining reporting format. Furthermore, other analogous formats capable of achieving the same objective can be used as the self-defining reporting format. The type field of the TLV format can be used to identify the object type being reported. For example, the object type can correspond to an index which can be used by the terminal 230 to access the appropriate object based on the hierarchical mapping of objects in the MIB 236, and may correspond to object ID 340. The length field can be used to define the length of the field which stores the object value. For example, the length field could store a value of eight (8), which indicates that an 8 byte field is used to store the object value. The value field would contain the reported object value. A recipient could therefore parse through a block of bytes and extract each object status report in sequence until all bytes have been parsed, while using the type field to determine what metric is being reported.

The self-defining format advantageously allows the recipient to extract and analyze each object status report contained in a block of received data (i.e., bytes). For example, if one terminal is configured to report the value of object_A every 1 minute and object_B every 2 minutes, the following sequence of object status reports may be transmitted: object_A, object_A and object_B, object_A, object_A and object_B, etc. If the terminal 230 receives a configuration profile specifying additional objects, then the corresponding object status reports may be interspersed with the reports for object_A and object_B. Based on the self-defining format, the recipient would be able to properly extract each object status report.

Once the object status reports have been prepared by the VRTM reporting agent 232, they must be supplied to the NMS 216. The VRTM reporting agent 232 therefore forwards the object status reports to the keep-alive sending module 234, where they are queued for transmission to the peer keep-alive receiving module 212 at the gateway 210. As previously discussed, the keep-alive sending module 234 sends periodic control and status messages to the gateway 210. According to one or more embodiments, the keep-alive sending module 234 concatenates the queued object status reports onto, or within, messages being sent to the gateway 210. The object status reports can be concatenated onto various types of messages including, for example, the aforementioned keep-alive messages as well as user traffic messages.

Satellite communication systems often implement performance enhancing proxy (PEP) functions to optimize performance of transmission control protocol (TCP) connections across geosynchronous satellite hops. TCP operations across the internet are well known to perform poorly in presence of satellite hop latency (on the order of 240-260 msec per hop). The PEP implemented by satellite communication systems provide a reliable backbone protocol between the terminal 230 and gateway 210 for exchanging traffic, acknowledgements, flow control signals, etc. Further, such protocol generally includes a link keep-alive message exchange to verify the backbone path is in place and functional, and to detect missed messages.

According to at least one embodiment, VRTM data such as object status messages can be piggybacked onto return keep-alive messages from the keep-alive sending module 234 for real-time monitoring of terminal status. The VRTM data can therefore be transmitted without the overhead associated with requesting return channel bandwidth and standard message headers. As used herein, the term "keep-alive message" is generally used to represent link keep-alive messages (used for verifying the status of backbone path, detect missed messages, etc.), backbone protocol messages (used for exchanging traffic, acknowledgements, flow control signals, etc.), and any acknowledgement messages in the return path direction from the terminal 230 (i.e., inroute or uplink). In addition to keep-alive messages, return user traffic messages (from the terminal) can also be used for concatenating object status messages. According to an embodiment, the terminal 230 can be configured to notify the keep-alive sending module 234, for example, when user traffic host messages are available or unavailable for piggybacking. In the event user traffic is available for piggybacking, the overhead with requesting return channel bandwidth can be eliminated. Furthermore, various types of optimizations (e.g., available only for user traffic) can be applied to the object status reports.

Depending on various factors, piggybacking of VRTM object data onto host messages will increase the size of those messages across the return satellite path (from the terminal 230), and potentially increase the bandwidth required to transmit the host message. According to various embodiments, such potential bandwidth increase can be reduced or eliminated by aligning the object status reports with the TDMA inroute burst allocations size or contention burst size for the satellite communication system 200.

Object status messages can be aligned with the size of TDMA inroute burst allocation in satellite networks that incorporate dynamic bandwidth allocation by the gateway 210 in response to terminal bandwidth requests and return queue depth backlog advertisements. Such systems accommodate this type of bandwidth requests by allocating a number of inroute transmit slots that is greater than or equal to some minimum allocation value, and depending on available bandwidth and terminal backlog. According to various embodiments, if the size of the keep-alive messages, or user traffic messages, is less than the allocated bandwidth, the terminal 230 will either pad out a smaller transmit burst to the allocated size, or will create a null packet burst to send in an otherwise unneeded allocation (i.e., one for which there is no traffic or control packet queued to send). According to various embodiments, the terminal 230 (or keep-alive sending module 234) can be configured to piggyback VRTM data (i.e., object status reports) up to the amount of unused bandwidth. Accordingly, the object status reports can be transmitted without incurring additional bandwidth.

Object status messages can also be aligned with the size of a contention burst if the satellite network uses contention channels for traffic in addition to allocated TDMA channels in the return path for traffic. For example, certain satellite networks can implement a Scrambled Code Multiple Access (SCMA) contention channel for interactive and traffic control messages (including backbone and keep-alive). SCMA provides for as-needed (i.e., without advance bandwidth allocation) terminal transmission of small packets, with iterative demodulation and/or cancelation at the gateway 210 to achieve high delivery probability as compared to a conventional ALOHA contention channel. According to various embodiments, the terminal 230 (or keep-alive sending module 234) can be configured to piggyback VRTM data (i.e., object status reports) that will fit in an SCMA burst in addition to the host message. For example, an object status message can be concatenated to a keep-alive message and fit into an SCMA burst, thereby enabling piggyback delivery of object status reports without an increase in return channel capacity.

Figure 4:
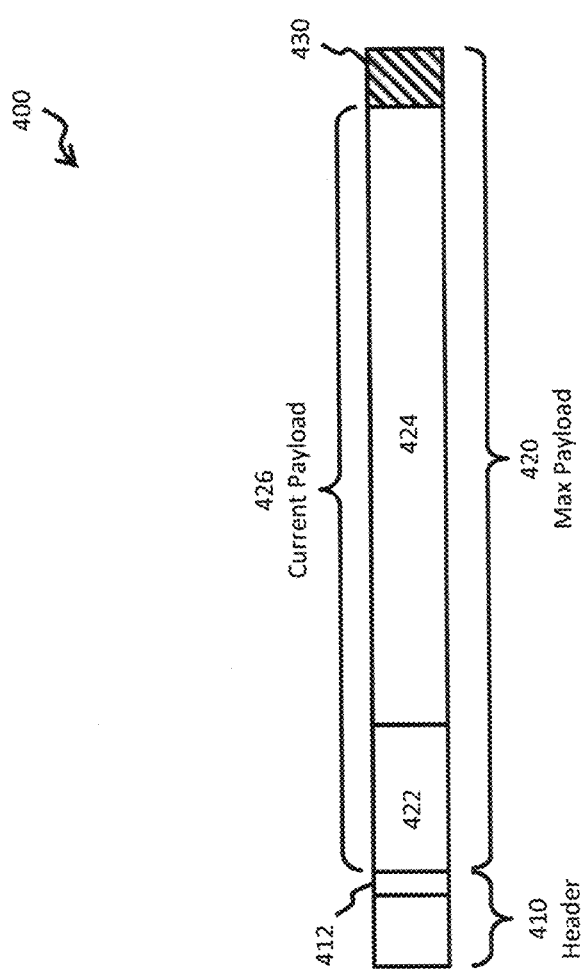
FIG. 4 is a diagram illustrating data packet containing a report, according to one embodiment.

Referring additionally to FIG. 4, various fields of an IPv6 packet 400 containing an object status report are illustrated. As previously discussed, each terminal 230 is assigned a TDMA inroute burst allocation containing one or more slots (or other structure) which represents the minimum amount of bandwidth allocation in the system. The slots may convey multiple IPv6 packets 400 (or simply "packets") that are transmitted from the terminal 230 to the gateway 210. Depending on the networking protocol being used, the slots may instead convey user datagram protocol (UDP) packets.

As illustrated in FIG. 4, the packet 400 generally includes a header 410 and payload 420. The header 410 includes, in part, a payload length field 412 which specifies the number of bytes used to store the data being transmitted through the packet 400. In the case of UDP packets, for example, the length parameter would identify the size of payload. The payload 420 can include, for example, extension headers 422 which may include additional processing information pertaining to the packet 400 and/or information used by devices in the network. The payload 420 also includes data field 424 corresponding to the actual data being transmitted. The data field 424 is also referred to as an upper layer protocol data unit. Depending on the size of the keep-alive or host message being transmitted, the amount of data in the packet 400 may not occupy the entire size allocated to the payload 420. According to the embodiment illustrated in FIG. 4, the data 424 being transmitted does not occupy the entire space allocated in the packet. The remaining space 430 is therefore usable for piggybacking object status reports. The keep-alive sending module 234 can replace the existing checksum for the packet 400 with a new value in order to verify its authenticity upon receipt. Depending on the amount of free space in the allocated slot, multiple packets 400 may be available for appending object status reports.

The specific manner in which object status reports are configured for transmission from the terminal 230 can vary depending on the particular system implementation. For example, if piggybacking is targeted at keep-alive messages, the available space may be determined based, at least in part, on the difference between the keep-alive message size and the typical return path burst size (i.e., TDMA allocation or contention). If piggybacking is also targeted at user return traffic messages, the available space can vary packet by packet, and may be the difference between an actual and the maximum inroute packet size. In either case, the available piggyback space is calculated and VRTM (i.e., object status) reports are added opportunistically. It might be the case during some period that available piggyback space is less than the aggregate size of the monitoring data pending to be sent. According to various embodiments, one or more scheduling policies can be applied to optimize the manner in which VTRM reports are transmitted. As previously discussed, the configuration profile received from NMS 216 can include a priority associated with different object statuses. The priority can be used to queue object status reports for transmission to the gateway 210.

As piggyback space becomes available in candidate host messages, the queued object status reports are examined for piggyback fit according to priority order from highest to lowest priority. Furthermore, the forwarding mask associated with the object status report must also fit in the available space. The queued object status reports are examined within each priority level, and across priorities if necessary. More particularly, all object status reports having the highest priority (e.g., priority=1) are examined. If the first queued object status report having the highest priority is too big to fit into the available piggyback space, then the second queued object status report having the highest priority is examined. If the second queued object status report having the highest priority fits into the available piggyback space, then it is sent. Otherwise, if the second queued object status report having the highest priority is also too big to fit into the available piggyback space, then the next queued object status report having the highest priority is examined for a possible fit. The process continues until all queued object status reports having the highest priority are examined. If none of the object status reports having the highest priority are able to fit on the available piggyback space, then the queued object status reports having the next highest priority (e.g., priority=2) are examined in the similar manner. The process further continues until object status reports from all priorities have been examined. As the process continues, object status reports are iteratively added in order to piggyback as many object status reports as will fit into the available piggyback space.

According to at least one embodiment, top priority queued object status reports are treated as mandatory for timely delivery. Such VRTM reports may be needed, for example, to demonstrate SLA compliance or for other critical operational functions. If a top priority object status report cannot be sent within some configured time of queuing (for example, 2 minutes), then the object status report is transmitted as a dedicated VRTM message without piggybacking. Furthermore, other queued object status reports that will fit into the dedicated VRTM message are also added in order to utilize the entire bandwidth allocated to the VRTM message. Such object status reports can be selected, for example, based on the priority order from among all priorities. According to an embodiment, lower priority queued object status reports are treated as opportunistic for timely delivery. Queued lower priority object status reports that cannot be sent within some configured time of (for example, 5 minutes) are discarded.

The piggybacked object status messages transmitted from the keep-alive sending module 234 of the terminal 230 are received by the keep-alive receiving module 212 of the gateway 210, where they are extracted from the keep-alive or traffic messages. As previously described, the packets include a payload length field (i.e., 412 in FIG. 4) which indicates the size of the data being transmitted to the destination. The keep-alive receiving module 212 examines the value in the payload length field (412) and extracts data present between the original payload (424) and the end of the packet, which corresponds to the object status report (or reports). The keep-alive receiving module 212 may further generate a new checksum value, if the original checksum value was replaced by the keep-alive sending module 234 after piggybacking the object status message.

The gateway 210 subsequently forwards the object status messages to the VRTM management unit 220, and forwards the keep-alive and traffic content to their destinations in a normal manner. According to various embodiments, the extraction process can be accomplished due to the self-defining format used for the object status reports (or VRTM report), without the keep-alive receiving module 234 having a priori knowledge of what, if anything, to expect in messages from any given terminal 230. The keep-alive receiving module 234 processes the backbone traffic or control content of messages in accordance with the appropriate transport protocol, taking care to not forward piggybacked VRTM content (or object status messages) to external network interfaces. Furthermore, the keep-alive receiving module 234 adjusts any packet checksums to exclude removed content that will not be forwarded to external network interfaces.

As previously discussed, each VRTM object (i.e., object status report) is self-defining and includes type, length and value, with forwarding mask. Extracted VRTM objects are queued to the VRTM management unit 220 for processing. Depending on the specific implementation, the VRTM management unit 220 may add a receive timestamp to each received VRTM object. According to one or more embodiments, the keep-alive receiving module 212 may append additional information to each VRTM object queued to the VRTM management unit 220, including, for example, the identity of the terminal 230 submitting the object status report. If the satellite network 200 includes VNOs 228, then the customer (VNO) identification for that terminal may be appended to the VRTM object. As previously discussed, a VNO 226 can be a business or government organization that purchases a managed service and associated capacity from a satellite network operator, in order to provide communication connectivity for a population of terminals 230 owned or operated by that organization.

VRTM objects received by the VRTM management unit 220 are subsequently forwarded to the appropriate monitoring systems 222 for analysis. The specific monitoring systems 222 available can vary depending on the specific system implementation. For example, the first system 222*a* may be a performance management database configured to store data being logged for long term trend analysis, report or dashboard generation, targeted analysis functions, and/or for real-time comparison of current performance versus desired or predetermined baselines. The second system 222*b* may be a service level agreement (SLA) monitoring system which receives data for a VNO or customer having an established SLA. The second system 222*b* may be configured for logging, analysis, report generation, or SLA alarm generation. The third system 222*c* may be an NMS application or tool configured to monitor and analyze data received from terminals 230 in order detect and/or diagnose certain problems. Furthermore, the VRTM management unit 220 can forward VRTM reports to external systems 224 located outside of the NMS 216 such as external telemetry interfaces, a performance management function of a manager-of-managers (MoM) system, a performance management function of a specific VNO or customer, etc.

The specific reporting systems 222 that receive VRTM reports can be identified in various manners. According to one or more embodiments, the NMS 216 can be configured to provide VRTM forwarding configuration, to the VRTM management unit 220, identifying the destination(s) for object status reports from all terminals, or corresponding to a given VNO 228 or customer ID. Thus, real-time performance status for terminals of a first VNO might be sent to a first external interface, real-time status for terminals of a second VNO might be sent to a second external interface as well as to an SLA monitoring system, real-time status for terminals of a third VNO might be sent to no external interfaces or systems, but performance status for all terminals of all VNOs might be logged to the performance management database (i.e., first system 222a). According to additional embodiments, the forwarding mask included in VRTM reports queued to the VRTM management unit 220 can be used to identify the destination of the VRTM reports.

Depending on the particular system implementation, it might be that only certain object types should be sent to an SLA monitoring system, whereas those same and/or other object types should be sent to an external interface, whereas further object types are only consumed by a diagnostic tool. The forwarding mask may be mapped to the configuration profile and candidate interfaces. For example, the first bit in the forwarding mask may identify the first system 222a, the second bit may identify the second system 222b, the third bit may identify an external system 224, etc. The forwarding mask can therefore be used to insure proper delivery of object status reports to the appropriate monitoring system.

Figure 5:
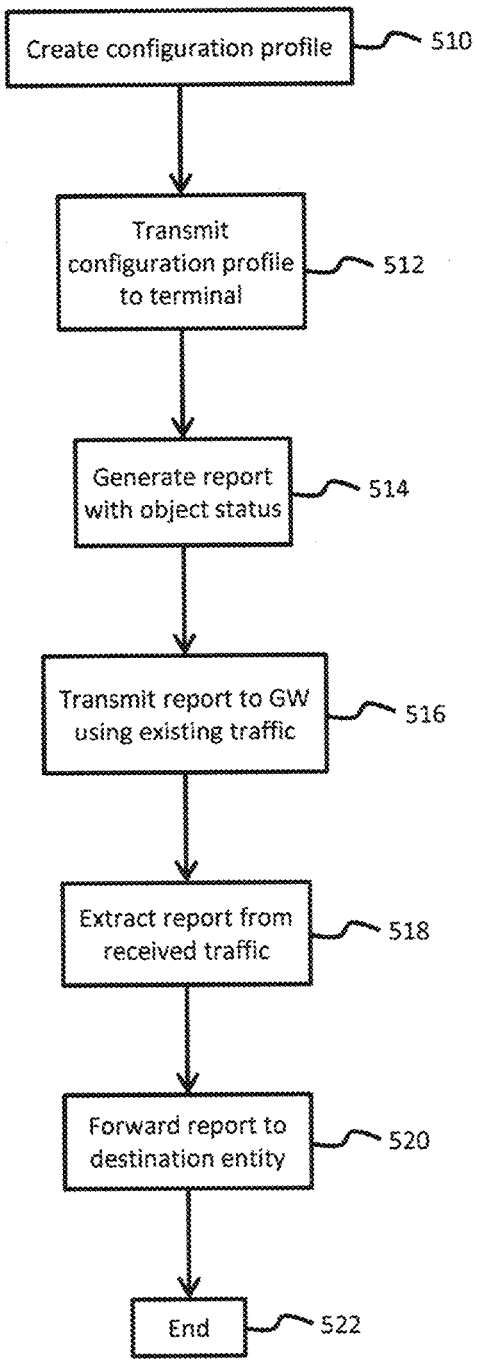
FIG. 5 is a flowchart of a process for real-time monitoring of terminals, according to at least one embodiment.

FIG. 5 is a flowchart of a process for real-time monitoring of terminals, according to at least one embodiment. At 510, a configuration profile is created. The configuration profile can include, for example, various information which specifies a reporting format to be used by the terminal in reporting the status of one or more objects. Each object can correspond to a parameter associated with operation or status of the terminal. According to an embodiment, the objects can be stored as nodes in a hierarchy tree within the MIB of the terminal. At 512, the configuration profile is transmitted to the terminal. At 514, the terminal generates a report containing the object status (i.e., VRTM report) for each object identified within the configuration profile. Depending on the specific type of terminal and/or the type of information desired, the configuration profile may specify a single object or multiple objects. Accordingly, the report generated by the terminal may correspond to the status of a single object, or the report may correspond to the status of each of the multiple objects specified in the configuration profile.

At 516, the terminal transmits the report to the gateway using existing traffic. As previously discussed, inroute bandwidth allocation from the terminal can be costly in both time and bandwidth. For example, the terminal must first submit a request to the gateway for bandwidth allocation, and wait for a response. Upon receiving the bandwidth allocation, the terminal would proceed to submit the report to the gateway. Under many circumstances, however, the size of the report will be less than the size of the packet overhead associated with transmitting the report. Accordingly, the terminal utilizes existing traffic opportunities to submit the report to the gateway without incurring the additional overhead associated with dedicated bandwidth assignment. While the status of certain objects may be prioritized for immediate process using dedicated bandwidth, the majority of reports can be submitted to the gateway as part of existing system traffic or user traffic. According to an embodiment, the sending module included in the terminal monitors keep-alive traffic being supplied to the gateway for purposes of maintaining network connections, and appends the report to qualified keep-alive messages, thereby eliminating unnecessary overhead.

At 518, the report is extracted from the received traffic (e.g., keep-alive message, user traffic, etc.). According to at least one embodiment, the gateway keep-alive receiving module examines all keep-alive messages received from the terminal in order to determine if a report has been appended to the message. Upon detecting the existence of a report, the gateway keep-alive receiving module extracts the report from the traffic (e.g., keep-alive message, user traffic, etc.). At 520, the report is forwarded to the appropriate destination entity. As previously discussed, the destination entity can correspond to various systems which require periodic status information from the terminals in order to monitor system performance and diagnose potential problems. Depending on the specific object status identified in the configuration profile, the report can be forwarded to a single destination entity or multiple destination entities. The process ends at 522.

Figure 6:
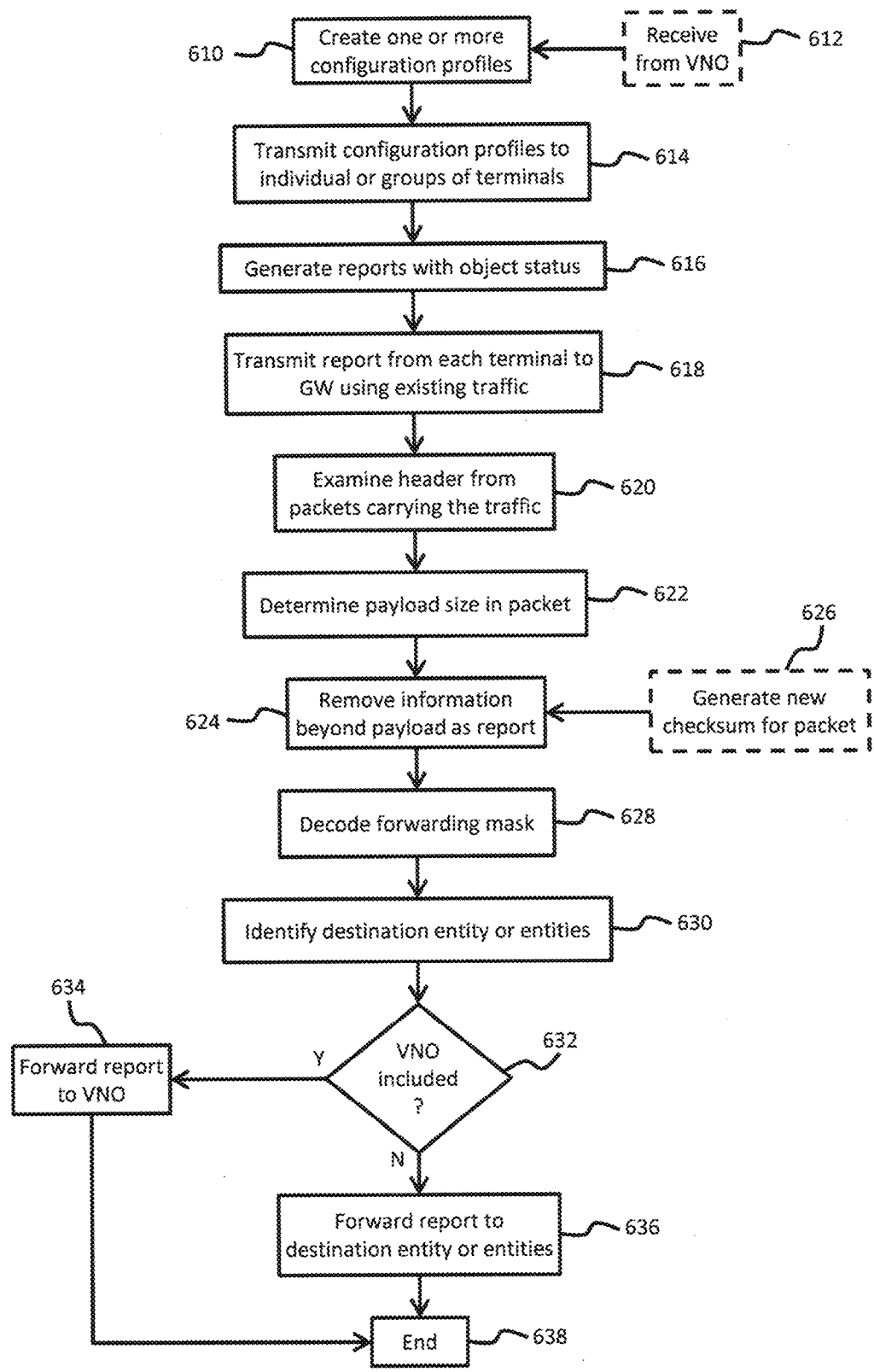
FIG. 6 is a flowchart of a process for real-time monitoring of terminals, according to various embodiments.

FIG. 6 is a flowchart of a process for real-time monitoring of terminals, according to various embodiments. At 610, one or more configuration profiles are created. According to at least one embodiment, the configuration profiles can be created by a configuration manager located in an NMS at the gateway. According to other embodiments, the NMS can be remotely located from the gateway. Thus, a network connection can be established with the gateway in order to supply the configuration profile for transmission over the satellite link. According to at least one embodiment, the configuration profiles can be received from a separate VNO responsible for managing some or all of the terminals within the system. This is indicated at 612. More particularly, the configuration profiles can be created by the VNO and supplied to the NMS for transmission to its subset of terminals. Accordingly, configuration profiles can be created by either the configuration manager, the VNO, or both.

At 614, the configuration profiles are transmitted to individual or groups of terminals. More particularly, depending on the type of terminals operating within the system, and the type of information desired, the configuration profiles can be specifically tailored to retrieve the status of desired objects. For example, a configuration profile can be supplied to all terminals within a particular coverage beam in order to assess various information, while a different configuration profile can be provided to all VSAT terminals, and still another configuration profile supplied to all mobile terminals. Additionally, a separate configuration profile (or profiles) can be supplied to all terminals operated by the VNO. At 616, reports are generated with the status of all objects specified in the configuration profiles. Thus, each terminal receiving a configuration profile would generate an object status report containing the status of all objects specified in its respective configuration profile.

At 618, reports from each terminal are transmitted to the gateway using existing traffic. According to an embodiment, each terminal can utilize its keep-alive sending module to monitor available space within existing traffic scheduled to be transmitted to the gateway. Based on the available space, the keep-alive sending module can append the object status report corresponding to its terminal so that it can be transmitted to the gateway without incurring additional bandwidth overhead. At 620, the gateway receives traffic (i.e., system traffic and user traffic) from the different terminals, and examines the header contained in packets carrying the traffic. According to an embodiment, the keep-alive receiving module at the gateway can perform this examination.

According to other embodiments, the keep-alive receiving module can incorporate a packet inspector which examines all packets received from the different terminals. According to still further embodiments, a separate packet inspector can be incorporated within the gateway to examine all packet data prior to receipt by the keep-alive receiving module.

At 622, the payload size of the packet is determined. This can be accomplished, for example, by examining the payload length field within the packet header. At 624, information beyond the payload is removed from the packet. This information is designated to be the object status report from the sending terminal. According to an embodiment, upon determining the payload size of the packet, the keep-alive receiving module concludes that information between the payload and the end of the packet corresponds to the object status report appended by the keep-alive sending module. According to at least one embodiment, after removing the report from the packet, the keep-alive receiving module can generate a new checksum for the packet. This is indicated at 626.

At 628, the forwarding mask within the report is decoded. According to one or more embodiments, the keep-alive receiving module can forward the report to a management unit which decodes the forwarding mask. The forwarding mask can be in the form of a multi-bit value, for example, which specifies one or more systems that should receive a particular report. Thus, upon decoding the forwarding mask, the management unit can identify each system and forward the report to the network address, or other identification, associated with the system. According to one or more embodiments, rather than decoding the forwarding mask, the gateway can be configured to store a table which stores relationships between the configuration profile and report recipient. Thus, upon receiving a report from a particular terminal, the gateway can query the database in order to identify the appropriate system for delivering the report.

At 630, the destination of each entity (or system) designed to receive the object status report is identified. As previously discussed, the destination can correspond to the IP address associated with such entities. At 632, it is determined whether any of the identified entities corresponds to a VNO. If any VNOs are identified, then the report is forwarded to the VNO using an external network such as the internet. This is indicated at 634. If the entities do not include a VNO, then the reports are forwarded to the appropriate destination entities at 636. According to at least one embodiment, the destination entities can be co-located at the gateway thereby allowing the report to be transmitted over a local or private network. According to other embodiments, however, the destination entities can be remotely located thereby requiring a secure communication link for transmitting the report. For example, a secure tunnel or encrypted communication link can be established to transmit the report. The process ends at 638.

Figure 7:
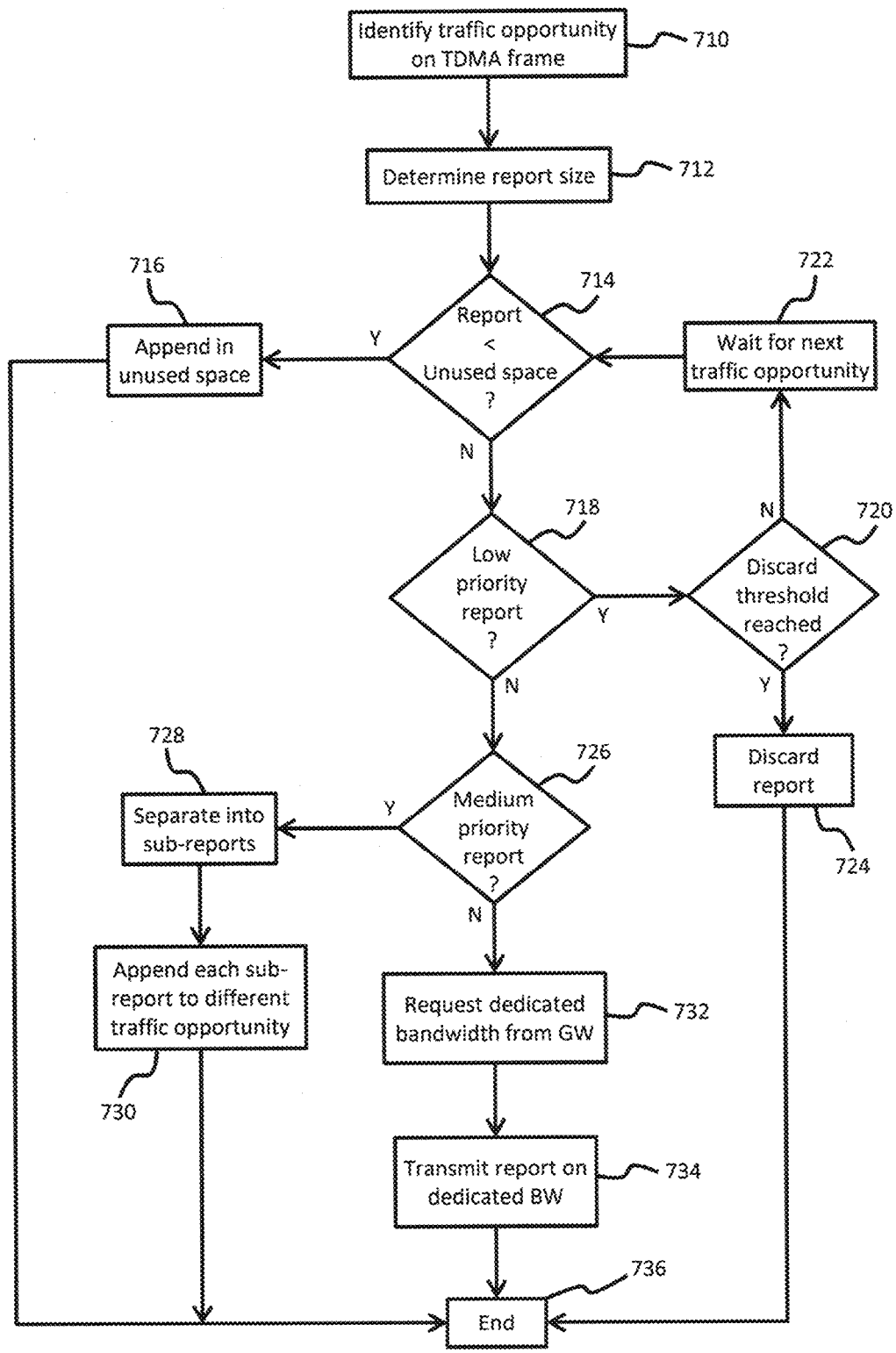
FIG. 7 is a flowchart of a process for concatenating status reports to existing traffic, according to one or more embodiments.

FIG. 7 is a flowchart of a process for concatenating status reports to existing traffic, according to one or more embodiments. At 710, a traffic opportunity is identified on the transmit frames. According to an embodiment, this can correspond to the keep-alive sending module determining when bandwidth has been allocated to transmit information to the keep-alive receiving module at the gateway. More particularly, the satellite communication system operates in a transmit mode wherein slots are allocated to different terminals by the gateway. The slots are used by the terminals for transmission of inroute traffic to the gateway. The inroute traffic can include information such as system traffic, user traffic, allocated traffic, etc. Upon detecting, for example, that a qualifying message (i.e., one which contains extra payload space) is ready for transmission to the keep-alive receiving module, the keep-alive sending module can utilize the opportunity to append a report. According to an embodiment, the keep-alive sending module can communicate with the reporting agent in order to determine whether or not a report defined by the configuration profile is ready for transmission. If a report is ready for transmission, it is provided to the keep-alive sending module.

At 712, the keep-alive sending module determines the size of the report. At 714, the keep-alive sending module compares the report to the unused (or available) space in the identified traffic opportunity. If the size of the report is less than the unused space in the traffic opportunity, then the report is appended in the unused space. For example, the keep-alive sending module may identify a report scheduled to be transmitted on the current transmit frame. Furthermore, the keep-alive sending module can determine the number of slots allocated for the message. For example, an exemplary message may be allocated four slots on the transmit frame. The actual message, however, may only be large enough to occupy 3.1 slots. Nonetheless, all four slots must be used in transmitting the message. The unused portion of the slot allocations (90% of the 4th slot) can therefore be used for appending the report. According to the embodiment illustrated in FIG. 7, if the size of the report is less than 90% of the size of one slots, then the report can be appended to the message at 716. Control would pass to 736 where the process ends for purposes of sending the current report. Depending on the reporting frequency specified in the configuration profile, however the process would be repeated by determining the next traffic opportunity on the transmit frame.

If the size of the report is greater than the unused space, then control passes to 718. The priority associated with the report for with individual object status is examined. According to an embodiment, the configuration profile can specify a particular priority for the entire report being supplied to the terminal. According to other embodiments, however, the configuration profile can include an individual priority setting for each entry (or object) contained in the configuration profile. A particular report can therefore include an entry specifying a high priority for one object, while specifying a low priority for another object. At 718, the priority would be examined in order to determine whether the report, or the individual object status being reported, has a low priority. If a low priority has been assigned to the report, control passes to 720 where it is determined if a discard threshold has been reached. As can be appreciated, different object statuses can be provided in the report at different intervals. The discard threshold can correspond, for example, to a time interval between successive reports. Furthermore, different discard threshold can be set based on the reporting frequency of individual objects. For example, a report having a frequency of 10 minutes may have a discard threshold of 2 minutes or 3 minutes. Accordingly, if 2 minutes have elapsed and the report has not been transmitted to the gateway, then it may be discarded. Similarly, the discard threshold can be set at 3 minutes, thereby allowing a particular report to be discarded if it has not been transmitted within 3 minutes. The discard threshold is therefore set while taking into account that the next report would be prepared for transmission at the 5 minute mark. Another report having a reporting frequency of 10 minutes, for example, may be assigned a discard threshold of 6 minutes.

If it is determined, at 720, that the discard threshold for the current report has not been reached, then control passes to 728 where the keep-alive sending module can wait for the next available traffic opportunity to become available. Control would then return to 714. If it is determined that the discard threshold has been reached, control passes to 724 where the report is discarded. The process would then end with respect to the current report.

If the report is not a low priority report, then control passes to 726 where it is determined if the report has been assigned a medium priority. If it is a medium priority report, then the report may be separated into multiple sub-reports at 728. According to one or more embodiments, each sub-report can correspond to one or more entries specified in the configuration profile for supplying a different object status. For example, if the configuration profile contains 8 entries, it may be separated to generate 2 sub-reports containing 4 entries each, or four sub-reports containing 2 entries each. According to at least one embodiment, upon determining the report has a medium priority, the keep-alive sending module may request that the reporting agent separate the report into multiple sub-reports. According to other embodiments, the keep-alive sending module may separate the report based on knowledge of the available traffic opportunities. At 730, the sub-reports may be appended to different traffic opportunities within the current and/or subsequent transmit slots. Control would then pass to 736 where the process ends for this particular report.

If the report does not have a medium priority assigned to it, control passes to 732. According to the illustrated embodiment, this would correspond to the report having a high priority assigned to it. It should be noted, however, that different priority levels may be assigned to the reports instead of the 3 priorities illustrated in FIG. 7. For example, instead of having a low, medium, or high priority, the priority levels can be assigned from 1-5, 1-10, etc. At 732, the terminal requests dedicated bandwidth from the gateway in order to transmit the report. This can correspond, for example, to a critical report that must be supplied in order to confirm the status of one or more components within the terminal. In order to ensure proper operation, delays are not acceptable for such reports. Thus, the overhead associated with requesting dedicated bandwidth becomes acceptable. At 734, the report is transmitted to the gateway using the dedicated bandwidth. The process subsequently ends at 736 for the current report.

Various features described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. For example, such hardware/software/firmware combinations can be incorporated into the previously described terminals, gateway, baseband components, fault management unit, network management system, receivers, transmitters, transceivers, VRTM reporting agent, keep-alive sending module, MIB, keep-alive receiving module, VRTM management system, configuration manager, VNO, etc. Additionally, such hardware can be interfaced to connect and/or facilitate communication between different components such as the VRTM reporting agent and keep-alive sending module, NMS and keep-alive receiving module, etc. Furthermore, various features can be implemented using algorithms illustrated in the form of flowcharts and accompanying descriptions. Some or all steps associated with such flowcharts can be performed in a sequence independent manner, unless otherwise indicated. Those skilled in the art will also understand that features described in connection with one Figure can be combined with features described in connection with another Figure. Such descriptions are only omitted for purposes of avoiding repetitive description of every possible combination of features that can result from the disclosure.

The terms software, computer software, computer program, program code, and application program may be used interchangeably and are generally intended to include any sequence of machine or human recognizable instructions intended to program/configure a computer, processor, server, etc. to perform one or more functions. Such software can be rendered in any appropriate programming language or environment including, without limitation: C, C++, C#, Python, R, Fortran, COBOL, assembly language, markup languages (e.g., HTML, SGML, XML, VoXML), Java, JavaScript, etc. As used herein, the terms processor, microprocessor, digital processor, and CPU are meant generally to include all types of processing devices including, without limitation, single/multi-core microprocessors, digital signal processors (DSPs), reduced instruction set computers (RISC), general-purpose (CISC) processors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components. Such exemplary hardware for implementing the described features are detailed below.

Figure 8:
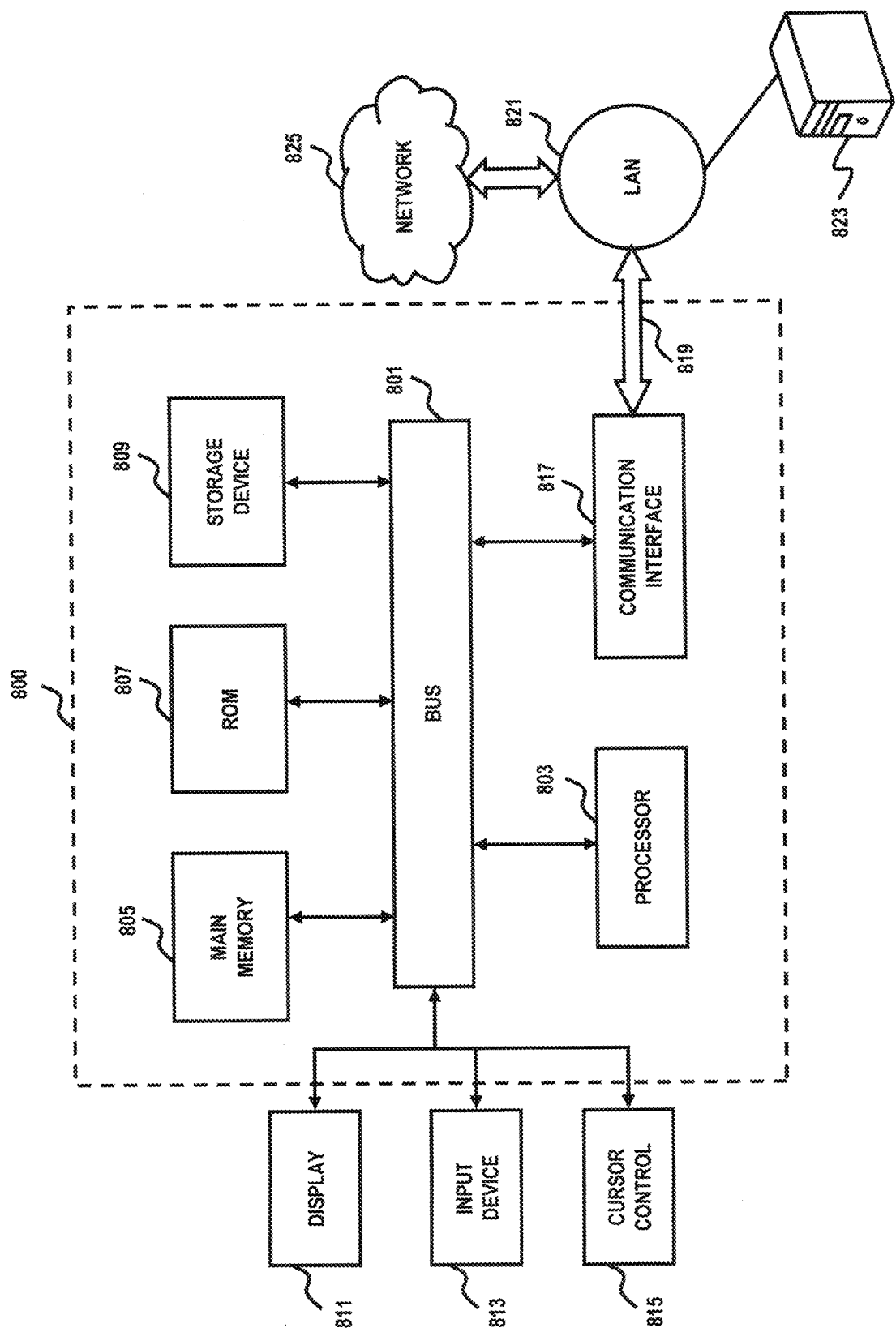
FIG. 8 is a diagram of a computer system that can be used to implement various exemplary features and embodiments.

FIG. 8 is a diagram of a computer system that can be used to implement features of various embodiments. The computer system 800 includes a bus 801 or other communication mechanism for communicating information and a processor 803 coupled to the bus 801 for processing information. The computer system 800 also includes main memory 805, such as a random access memory (RAM), dynamic random access memory (DRAM), synchronous dynamic random access memory (SDRAM), double data rate synchronous dynamic random-access memory (DDR SDRAM), DDR2 SDRAM, DDR3 SDRAM, DDR4 SDRAM, etc., or other dynamic storage device (e.g., flash RAM), coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a light emitting diode (LED) or other flat panel displays, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811. Additionally, the display 811 can be touch enabled (i.e., capacitive or resistive) in order facilitate user input via touch or gestures.

According to an exemplary embodiment, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multiprocessing arrangement may also be employed to execute the instructions contained in main memory 805. In alternative embodiments, hard-wired circuitry may be used in place of or in combination with software instructions to implement exemplary embodiments. Thus, exemplary embodiments are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, fiber optic service (FiOS) line, or any other communication interface to provide a data communication connection to a corresponding type of communication line. As another example, communication interface 817 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a High Definition Multimedia Interface (HDMI), etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 such as a wide area network (WAN) or the Internet. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an exemplary embodiment through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Non-volatile media can further include flash drives, USB drives, microSD cards, etc. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a USB drive, microSD card, hard disk drive, solid state drive, optical disk (e.g., DVD, DVD RW, Blu-ray), or any other medium from which a computer can read.

Figure 9:
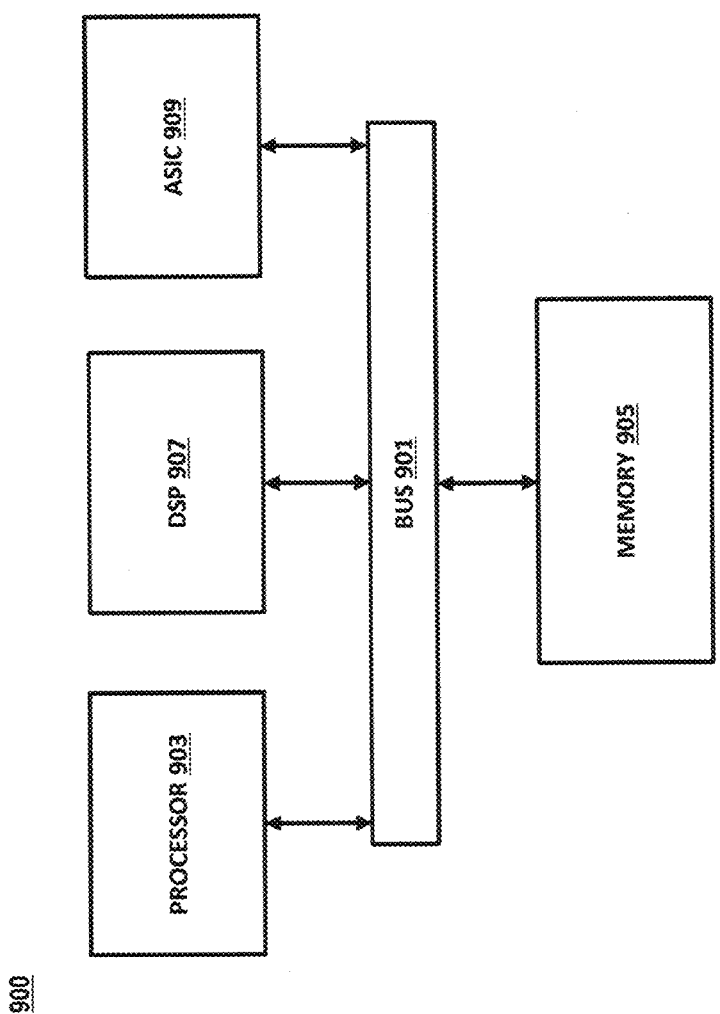
FIG. 9 is a diagram of a chip set that can be used to implement various exemplary features and embodiments.

FIG. 9 illustrates a chip set 900 upon which features of various embodiments may be implemented. Chip set 900 is programmed to implement various features as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 900, or a portion thereof, constitutes a means for performing one or more steps of the figures.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, re-writable optical disk, etc.) and static memory (e.g., ROM, CD-ROM, DVD, BLU-RAY disk, etc.) for storing executable instructions that when executed perform the inventive steps described herein. The memory 905 also stores the data associated with or generated by the execution of the inventive steps.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A method comprising:
creating a configuration profile specifying a reporting format for one or more object status;
transmitting the configuration profile to a terminal in a satellite communication system;
generating a report containing the one or more object status based, at least in part, on the configuration profile, wherein the report is self-defining;
transmitting the report to a gateway of the satellite communication system using available space within existing traffic of the terminal;
extracting the report from the received traffic; and
forwarding the report to at least one destination entity.

2. The method of claim 1, wherein the traffic includes at least one of system traffic, user traffic, and allocated traffic.

3. The method of claim 1, wherein the configuration profile includes fields corresponding to one or more of an object name, object ID, reporting frequency, priority, forwarding mask, and object length.

4. The method of claim 1, wherein each object status in the report is provided as an entry specifying a type, length, and value (TLV) for the object.

5. The method of claim 1, wherein forwarding the report further comprises decoding a forwarding mask included in the report to identify the at least one destination entity.

6. The method of claim 1, further comprising:
transmitting the configuration profile to at least one additional terminal in the satellite communication system, wherein each of the at least one additional terminal generates a corresponding report.

7. The method of claim 1, wherein:
creating a configuration profile further comprises creating two or more configuration profiles, each of the configuration profiles being different from each other; and
transmitting the configuration profile further comprises transmitting each of the two or more configuration profiles to the terminal.

8. The method of claim 1, wherein extracting the report further comprising:
examining a header of one or more packets associated with the traffic to determine a payload size;
removing information between a payload and an end of the one or more packets as the report; and
generating a new checksum value for the one or more packets.

9. The method of claim 1, wherein:
the traffic comprises one or more system messages; and
the report is appended within unused space from bandwidth allocated for the one or more system messages.

10. The method of claim 9, wherein the one or more system messages comprise keep-alive messages transmitted to the gateway for maintaining network connections.

11. The method of claim 9, further comprising:
determining a size of the report;
comparing the size of the report to a size of the unused space from bandwidth allocated for a selected system message; and
appending the report to the selected system message if the size of the report is less than the size of the unused space from bandwidth allocated for the selected system message.

12. The method of claim 11, wherein the size of the report is greater than the size of the unused space from bandwidth allocated for the selected system message, and further comprising:
separating the report into multiple sub-reports, each sub-report containing at least one object status; and
appending each sub-report to a selected system message.

13. The method of claim 11, wherein:
the bandwidth for the selected system message is allocated on a current TDMA frame; and
transmitting the report comprises deferring transmission until a subsequent TDMA frame, if the size of the report is greater than the size of the unused space from bandwidth allocated for the selected system message.

14. The method of claim 13, further comprising discarding the report if transmission is deferred more than a predetermined of number of times.

15. The method of claim 14, wherein the report is discarded based, at least in part, on a priority assigned to the report and/or a priority assigned to the one or more object status contained in the report.

16. The method of claim 1, wherein:
the traffic comprises one or more user messages; and
the report is appended within unused space from bandwidth allocated for the one or more user messages.

17. The method of claim 1, wherein transmitting the report further comprises requesting bandwidth allocation for the report, if a size of the report is greater than a size of available space within existing traffic of the terminal.

18. The method of claim 17, further comprising:
detecting a priority assigned to the report,
wherein the bandwidth allocation is requested based, at least in part, on the detected priority.

19. The method of claim 1, wherein:
the configuration profile is created by a virtual network operator (VNO); and
forwarding the report comprises forwarding the report to the VNO.

20. The method of claim 19, wherein:
the configuration profile is transmitted to one or more terminals in the satellite communication system; and
the one or more terminals are supported by the VNO.

21. A system comprising:
a terminal for communicating in a satellite communication system; and
a gateway for communicating in the satellite communication system, the gateway being configured to:
create a configuration profile specifying a reporting format for one or more object status, and
transmit the configuration profile to the terminal;
wherein the terminal is configured to:
generate a report containing the one or more object status based, at least in part, on the configuration profile, wherein the report is self-defining, and
transmit the report to the gateway system using available space within existing traffic of the terminal; and
wherein the gateway is further configured to:
extract the report from the received traffic; and
forward the report to at least one destination entity.

22. The system of claim 21, wherein the traffic includes at least one of system traffic, user traffic, and allocated traffic.

23. The system of claim 21, wherein the configuration profile includes fields corresponding to one or more of an object name, object ID, reporting frequency, priority, forwarding mask, and object length.

24. The system of claim 21, wherein each object status in the report is provided as an entry specifying a type, length, and value (TLV) for the object.

25. The system of claim 21, wherein the gateway is further configured to decode a forwarding mask included in the report to identify the at least one destination entity.

26. The system of claim 21, wherein the gateway is further configured to:
transmit the configuration profile to at least one additional terminal in the satellite communication system,
wherein each of the at least one additional terminal generates a corresponding report.

27. The system of claim 21, wherein the gateway is further configured to:
create two or more configuration profiles, each of the configuration profiles being different from each other; and
transmit each of the two or more configuration profiles to the terminal.

28. The system of claim 21, wherein the gateway is further configured to extract the report by:
examining a header of one or more packets associated with the traffic to determine a payload size;
removing information between a payload and an end of the one or more packets as the report; and
generating a new checksum value for the one or more packets.

29. The system of claim 21, wherein:
the traffic comprises one or more system messages; and
the report is appended within unused space from bandwidth allocated for the one or more system messages.

30. The system of claim 29, wherein the one or more system messages comprise keep-alive messages transmitted from the terminal to the gateway for maintaining network connections.

31. The system of claim 29, wherein the terminal is further configured to:
determine a size of the report;
compare the size of the report to a size of the unused space from bandwidth allocated for a selected system message; and
append the report to the selected system message if the size of the report is less than the size of the unused space from bandwidth allocated for the selected system message.

32. The system of claim 31, wherein the size of the report is greater than the size of the unused space from bandwidth allocated for the selected system message, and the terminal is further configured to:
separate the report into multiple sub-reports, each sub-report containing at least one object status; and
append each sub-report to a selected system message.

33. The system of claim 31, wherein:
the bandwidth for the selected system message is allocated on a current TDMA frame; and
the terminal is further configured to defer transmission of the report until a subsequent TDMA frame, if the size of the report is greater than the size of the unused space from bandwidth allocated for the selected system message.

34. The system of claim 33, wherein the terminal is further configured to discard the report if transmission is deferred more than a predetermined number of times.

35. The system of claim 34, wherein the report is discarded based, at least in part, on a priority assigned to the report and/or a priority assigned to the one or more object status contained in the report.

36. The system of claim 21, wherein:
the traffic comprises one or more user messages; and
the terminal is further configured to append the report within unused space from bandwidth allocated for the one or more user messages.

37. The system of claim 21, wherein the terminal is further configured to transmit the report by requesting bandwidth allocation for the report, if a size of the report is greater than a size of available space within existing traffic of the terminal.

38. The system of claim 37, wherein the terminal is further configured to:
detect a priority assigned to the report, wherein the bandwidth allocation is requested based, at least in part, on the detected priority.

39. The system of claim 21, wherein:
the configuration profile is created by a virtual network operator (VNO); and
the gateway is further configured to forward the report to the VNO.

40. The system of claim 39, wherein:
the gateway is further configured to transmit the configuration profile to one or more terminals in the satellite communication system; and
the one or more terminals are supported by the VNO.

* * * * *